G. A. SHOOK.
PYROMETER SCALE.
APPLICATION FILED OCT. 2, 1913.
1,196,306.
Patented Aug. 29, 1916.
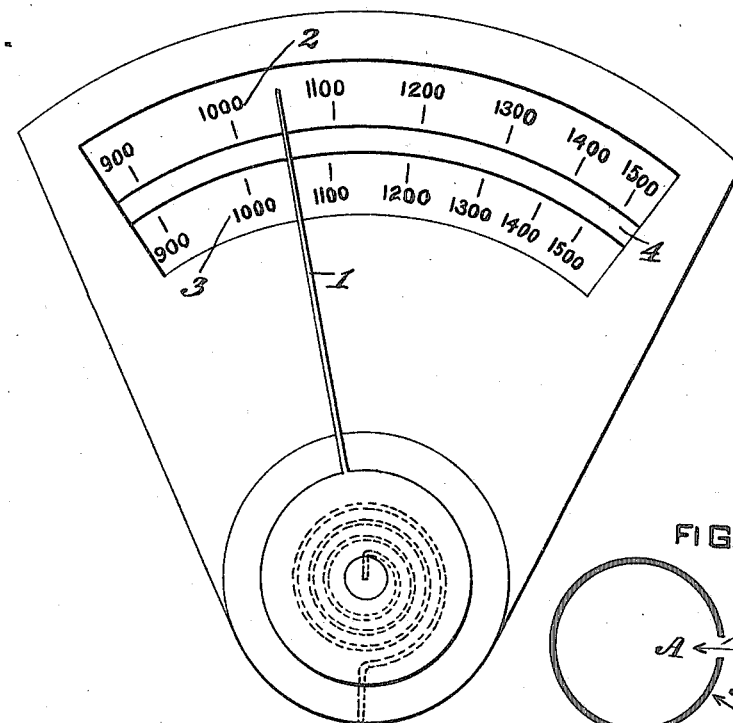
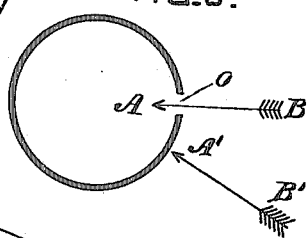
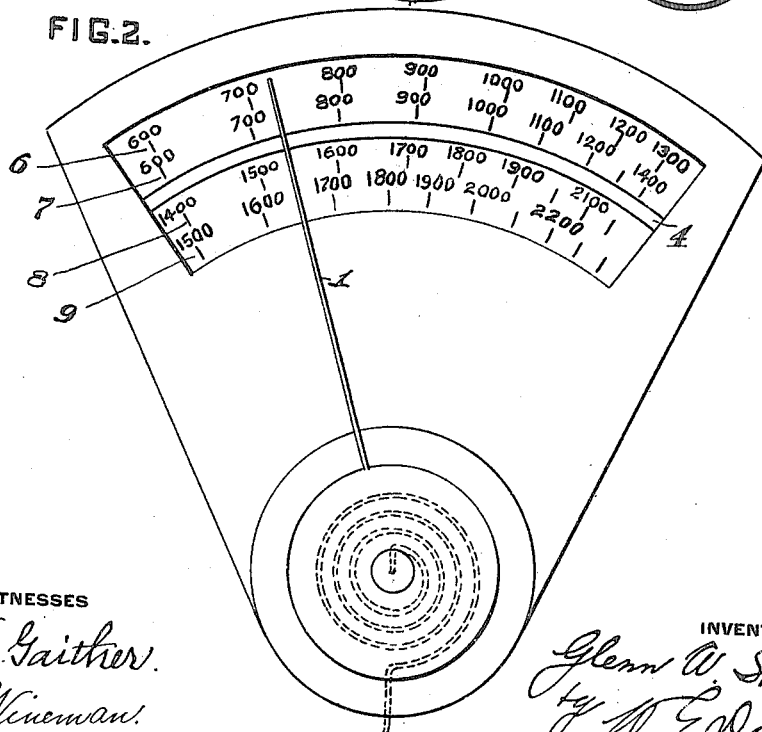
WITNESSES
F. E. Gaither.
Lois Wineman.
INVENTOR
Glenn A. Shook
by W. F. Doolittle
Attorney

UNITED STATES PATENT OFFICE.

GLENN A. SHOOK, OF URBANA, ILLINOIS, ASSIGNOR TO SCIENTIFIC MATERIALS COMPANY, OF PITTSBURGH, PENNSYLVANIA, A CORPORATION OF PENNSYLVANIA.

PYROMETER-SCALE.

1,196,306.  Specification of Letters Patent.  Patented Aug. 29, 1916.

Application filed October 2, 1913. Serial No. 793,058.

*To all whom it may concern:*

Be it known that I, GLENN A. SHOOK, a citizen of the United States, residing at Urbana, in the county of Champaign and State of Illinois, have invented certain new and useful Improvements in Pyrometer-Scales, of which the following is a specification.

My invention relates to total radiation pyrometer scales and its object is to provide means for enabling the true temperature of incandescent bodies in the open or under conditions not representing "black body" to be obtained.

In the accompanying drawings, Figure 1 is a diagrammatic view of a current measuring instrument which is used in connection with a total radiation pyrometer and which is calibrated to indicate the temperatures measured by the total radiation pyrometer; Fig. 2 is a like view of a similar instrument but which is provided with an extension scale which is used when the pyrometer proper is altered to measure high temperatures; and Fig. 3 is illustrative of certain principles of the invention.

The total radiation pyrometer referred to herein is one of ordinary construction and based upon the Steffan-Boltzmann fourth power radiation law, and the particular construction thereof need not be here described.

Referring to the drawing, 1 is a pointer movable over a scale 2 located directly under said pointer, and is adapted to indicate the true temperature in degrees centigrade, or Fahrenheit, of a hot body under black body conditions, that is, when said hot body is inclosed by heated walls. In practice the pointer is actuated in the usual way by thermo-electric currents. Also, directly under pointer 1, and concentric with scale 2, is a second scale 3 adapted to indicate the true temperature of a hot body when the latter is not under black body conditions. 4 designates a plane mirror which is sometimes used to facilitate correct reading of the position of the pointer.

As shown in Fig. 2, scale 6 and scale 8, which latter is merely an extension of 6, are adapted to indicate the true temperature of a body under black body conditions, while scale 7 and scale 9, which is an extension of scale 7, are adapted to indicate the true temperatures of a hot body in the open.

In operation, when the radiation from a hot body falls upon the junction of a thermocouple located in the total radiation pyrometer, a thermo-electric force is developed and pointer 1 swings over the scale 2, and finally comes to rest opposite a number or a graduation on scale 2 which indicates a certain temperature, and at the same time the pointer stands opposite a graduation on scale 3 which indicates another temperature which bears a certain relation to the temperature indicated by scale 2, and which relation will now be described.

At present, all radiation pyrometers are adapted to indicate black body temperatures only, that is, the temperature that is obtained by measuring the radiations which emanate from the interior of a heated inclosure; thus, if a pyrometer is sighted upon a piece of iron surrounded by heated walls and in temperature equilibrium with the walls, the pyrometer will indicate the true or thermo-dynamic temperature of the piece of iron, but if the iron is removed from the inclosure and the pyrometer is again sighted upon it, it will indicate an apparent temperature which is somewhat less than the true temperature of the iron. This apparent temperature is called the black body temperature. Moreover, the black body temperature that is determined by an optical pyrometer will be different from the black body temperature that is determined by means of a total radiation pyrometer. Suppose, for example, a piece of iron has a true temperature of 1200 degrees absolute, an optical pyrometer when sighted upon the iron, the iron being in the open, would indicate a temperature of about 1125 degrees, while a total radiation pyrometer would indicate a temperature as low at 900 degrees. It is thus seen that the black body temperature is not only different from the themo-dynamic temperature of a hot body, but that it is different according as it is determined by different types of pyrometers.

In illustration of this point, Fig. 3 shows a diagram representing a hollow body, which has a small opening O. This body is heated and the total radiation pyrometer sighted through the opening O in a direction AB. The pyrometer will indicate on the scale 2 the black body temperature of the heated body. Since the radiation comes from the interior of the body, black body conditions obtain and the black body temperature is equal to the true temperature. If, however, the pyrometer is sighted on the outside of the body, the pyrometer scale usually employed and such as is indicated at 2 on the drawings will not give the correct temperature but an apparent temperature.

The same statements apply to the indication of the temperature of an incandescent body within an inclosure such as a furnace and to the indication of the temperature of such body when outside of the furnace. Under the former circumstances, the body is said to be under black body conditions.

My invention consists in providing means whereby the true temperature existing when the object is not under black body conditions may be instantly observed from the scale, the proper calibration of which scale is based upon certain discoveries and calculations made by me and based upon the relation of such true temperature to the black body temperature.

The energy of a black body in terms of its absolute temperature may be expressed by the Steffan-Boltzmann radiation law.

Referring to Fig. 3, let $J$ be the intensity of the radiation emanating from the interior of the inclosure, and $T$ the corresponding temperature of the interior. Also, let $J_0$ represent the intensity of the radiation from the exterior and $T_0$ the corresponding temperature. $T$ is the true temperature of the body and $T_0$ the corresponding black body temperature which is less than $T$. The Steffan-Boltzmann law may be written in the form $$J = CT^4$$

where $J$ = the energy of the radiation, $T$ = the absolute temperature, and $C$ = a constant.

In the above equation, $T$ represents the temperature and $J$ the energy when the object is under black body conditions. Now let $J_0$ represent the energy, and $T_0$ the apparent temperature when the same is not under black body conditions; that is, in the case of a piece of iron in the furnace, $T$ would represent the temperature observed by the pyrometer and would be the true temperature, while $T_0$ would be the temperature that the pyrometer would indicate after the body is removed from the furnace.

The temperature of the body outside the furnace will be determined according to the following equation:

$$J_0 = CT_0^4$$

Combining the two equations $$\frac{J_0}{J} = \frac{T_0^4}{T^4} = \left(\frac{T_0}{T}\right)^4$$

This equation may be put in the form $$\log. \frac{J_0}{J} = 4 \log. \frac{T_0}{T} = 4 (\log. T_0 - \log. T)$$

But $\frac{J_0}{J}$, the ratio of the energy emitted by any body to the energy emitted by a black body, is by definition equal to the emissive power of the body and the emissive power is equal to the absorptive power.

We may now write $$\log. T = \log. T_0 - \tfrac{1}{4} \log. A$$

or $$\log. T = \log. T_0 + k$$

where $$k = -\tfrac{1}{4} \log. A.$$

The constant $k$ depends only upon the absorptive power $A$ of the body whose true temperature is desired.

We may also arrive at a simpler equation for determining the true temperature of any body in the open in the following manner:

We may write $$\frac{T}{T_0} = \left(\frac{J}{J_0}\right)^{\frac{1}{4}}$$

or $$T = T_0 \left(\frac{J}{J_0}\right)^{\frac{1}{4}} = T_0 \left(\frac{1}{A}\right)^{\frac{1}{4}}$$

Suppose for example that a metal has an emissive power of 0.30 and that its black body temperature $T_0$, as determined by a total radiation pyrometer is 1000 degrees absolute. Its true temperature is from the above equation.

$$T = T_0 \left(\frac{1}{0.30}\right)^{\frac{1}{4}} = T_0 (1.351)$$

$$= 1000 (1.351) = 1351° \text{ abs.}$$

In this manner the following table was constructed:—

| Black body temperatures. $T_0$ | True temperatures. $T$ |
|---|---|
| 700 | 946 |
| 800 | 1081 |
| 900 | 1216 |
| 1000 | 1351 |
| 1100 | 1486 |
| 1200 | 1621 |
| 1300 | 1757 |
| 1400 | 1892 |
| 1500 | 2027 |
| 1600 | 2162 |

In this way the true temperature of any heated body can be determined if its emissive power is known.

The method of constructing a true temperature scale such as is indicated by the numeral 3 in the drawings, for any type of total radiation pyrometer is readily seen.

What I claim is:

1. A radiation pyrometer, having a scale indicating black body temperatures associated with a scale calibrated to indicate true temperatures of the body when not under black body conditions.

2. A total radiation pyrometer, having a scale indicating black body temperatures associated with a scale calibrated relatively to the black body scale to indicate true temperatures of the body when not under black body conditions, said scales being inscribed within arcs of circles whose center is the same as the center of movement of the pointer.

3. A total radiation pyrometer having a scale calibrated to represent true temperatures of a hot body and based upon the following formula:

$$\log. T = \log. T_0 + k$$

in which T represents the true temperature of a hot body and $T_0$ the black body temperature of the hot body and in which $k$ represents a constant depending upon the material of which the body is composed.

In testimony whereof I affix my signature in presence of two witnesses.

GLENN A. SHOOK. [L. S.]

Witnesses:
O. A. RANDOLPH,
W. H. BAIR.

Copies of this patent may be obtained for five cents each, by addressing the "Commissioner of Patents, Washington, D. C."